R. N. B. KIRKHAM.
Horse Hay-Fork.

No. 205,276.  Patented June 25, 1878.

WITNESSES:
Francis McArdle,
C. Sedgwick

INVENTOR:
R. N. B. Kirkham
BY Munn & Co
ATTORNEYS.

UNITED STATES PATENT OFFICE.

RICHARD N. B. KIRKHAM, OF KANSAS, ILLINOIS.

IMPROVEMENT IN HORSE HAY-FORKS.

Specification forming part of Letters Patent No. 205,276, dated June 25, 1878; application filed April 30, 1878.

*To all whom it may concern:*

Figure 1:
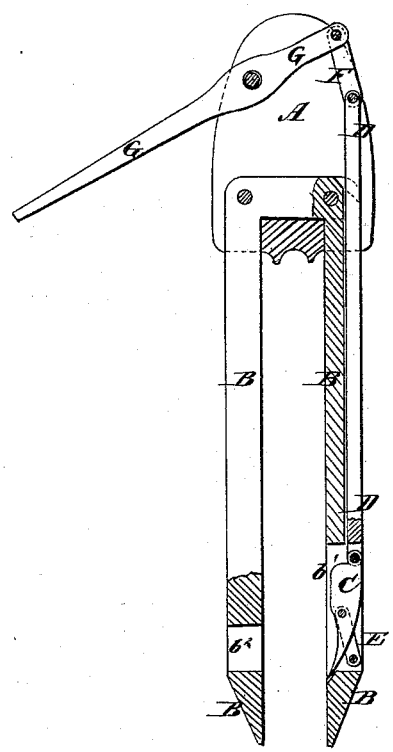
Figure 2:
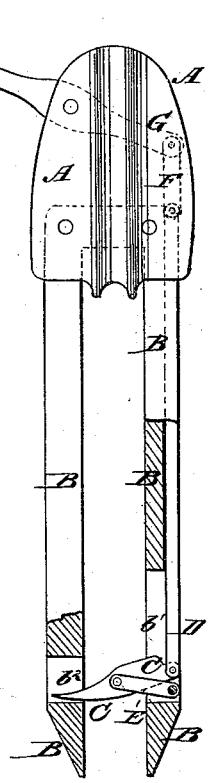
Figure 3:
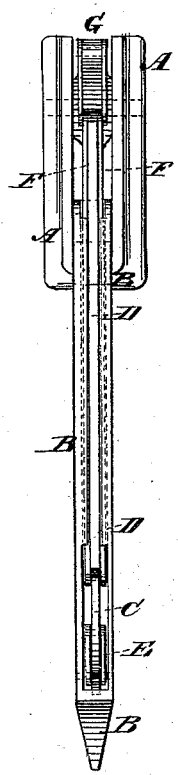

Be it known that I, RICHARD N. B. KIRKHAM, of Kansas, in the county of Edgar and State of Illinois, have invented a new and useful Improvement in Horse Hay-Forks, of which the following is a specification:

Figure 1 is a longitudinal section of my improved hay-fork. Fig. 2 is a side view of the same, partly in section, to show the construction. Fig. 3 is an edge view of the same.

Similar letters of reference indicate corresponding parts.

The object of this invention is to furnish an improved horse hay-fork which shall be so constructed that it may be easily thrust into the hay, which will hold a load securely, and which at the same time shall be simple in construction and convenient in use.

The invention consists in the combination of the slotted head, the two straight parallel tines, the barb, the pivoted bars, and the trip-lever with each other, as hereinafter fully described.

A represents a block, made of cast-iron or other suitable material, and which is slotted longitudinally from its upper end nearly to its lower end, and has a groove formed across its lower end and along its opposite sides to receive the hoisting-rope.

B are the tines, two of which are used, and which are made straight and parallel with each other. The tines B may be formed in one piece by bending a bar at its center into U form. The bend of the tines B is passed into the slot of the head-block A, and is secured in place by bolts or rivets.

In a slot, $b^1$, in one of the tines B, near its lower end, is placed the rear end of a barb, C, which is pivoted at the said rear end to the lower end of a rod, D, which slides in a groove formed in the outer side of the tine B.

To the middle of the barb C is pivoted the end of a bar or bars, E, the other end of which is pivoted to the tine B, at the lower end of the slot $b^1$.

The upper end of the sliding rod D is pivoted to the lower ends of two short connecting-bars, F, the upper ends of which are pivoted to the end of a lever, G. The lever G passes through the upper part of the slot in the head-block A, and is pivoted to the said block near its other side, as shown in Figs. 1 and 2. To the outer end of the lever G is designed to be attached the end of the trip-rope.

With this construction, by moving the outer end of the lever G downward, the sliding rod D will be drawn upward, which will draw the barb C into the slot $b^1$, and drop the load of hay.

With this construction, also, when the tines B have been thrust into the hay, by raising the outer end of the lever G, the sliding rod D will be forced downward, and the point of the barb C will be forced horizontally through the hay and into a slot, $b^2$, in the other tine, so that the said barb C, when supporting the hay, may be supported by both tines B.

If desired, a scissors-edge may be formed upon the barb C, and also upon the edge of the connecting-rod E, so that any straws or spears of grass that may lodge between said parts may be cut off by the said edges, and be prevented from impeding or clogging the movements of the said parts.

Having thus described my invention, I claim as new and desire to secure by Letters Patent—

The combination of the slotted head A, the two straight parallel tines B, the barb C, the pivoted bar E, the sliding rod D, the pivoted bars F, and the trip-lever G with each other, substantially as herein shown and described.

RICHARD N. B. KIRKHAM.

Witnesses:
CHARLES T. ESTES,
F. M. COLEMAN.